United States Patent [19]
Kanno et al.

[11] Patent Number: 5,195,175
[45] Date of Patent: Mar. 16, 1993

[54] IMAGE SYNTHESIZING SYSTEM

[75] Inventors: Yoshimitsu Kanno, Sagamihara; Shin Yamada; Teruo Fumoto, both of Kawasaki, all of Japan

[73] Assignee: Matsushita Electric Industrial Co., Ltd., Osaka, Japan

[21] Appl. No.: 710,481

[22] Filed: Jun. 5, 1991

[30] Foreign Application Priority Data

Jun. 5, 1990 [JP] Japan ................................. 2-148277

[51] Int. Cl.$^5$ ............................................. G06K 15/00
[52] U.S. Cl. ....................................... 395/106; 382/58; 395/109; 358/474
[58] Field of Search ................ 395/106, 101, 109, 110, 395/114, 275, 146, 147; 382/57, 62, 58, 54, 56; 358/450, 452, 474, 497

[56] References Cited

U.S. PATENT DOCUMENTS

| | | | |
|---|---|---|---|
| 4,984,163 | 6/1991 | Kawamata et al. | 395/106 |
| 5,148,295 | 9/1992 | Matsubara et al. | 358/451 |

FOREIGN PATENT DOCUMENTS

| | | | |
|---|---|---|---|
| 1-13587 | 1/1989 | Japan | 395/109 |
| 1-80168 | 3/1989 | Japan | 395/109 |
| 1-105743 | 4/1989 | Japan | 395/109 |

Primary Examiner—Arthur G. Evans
Attorney, Agent, or Firm—Lowe, Price, LeBlanc & Becker

[57] ABSTRACT

An image synthesizing system provided with an interpolation circuit for interpolating data of neighboring pixels of a multi-level picture, a decompression circuit for converting data representing characters and graphic forms into data of pixels thereof, a first look-up table unit for converting the data of pixels composing the characters and graphic forms into data representing gradation levels of a four-color halftone, a second look-up table unit for outputting control data for synthesis which includes halftone-dot pattern information used to indicate halftone-dot patterns corresponding to the characters and the graphic forms and region discriminating information used to indicate which of the characters and the graphic forms should be clipped, a multi-level picture and bi-level element comparison circuits, which are independent of each other, respectively converting the multi-level picture and the bi-level characters and graphic forms into bi-level dot patterns and a selecting circuit for selectively outputting one of the bi-level dot patterns respectively corresponding to the bi-level characters and the bi-level graphic forms.

9 Claims, 20 Drawing Sheets

FIG. 2

RUN LENGTH ENCODING BASED ON «ANSI IT8.2·1988 »
CC ········ COLOR CODE

| | | | | |
|---|---|---|---|---|
| LINE STARTING CODE | 00 00 | | | |
| SHORT DATA FORMAT | | CC (*1) | | CC = ('00 ; '01~'FF) <br> *1 = '01~'FF |
| LONG DATA FORMAT | | | CC 00 (*2) | CC = '01~'FF <br> *2 = '0001~'FFFF |
| | | | 00 00 (*3) | (COLOR CODE = '00 <br> *3 = '0001~'FFFF) |
| LINE COPY CODE | | | RP 00 00 | RP = NUMBER OF COPY LINES |
| LINE TERMINATING CODE | 00 00 | | | |

FIG. 5

| | | | |
|---|---|---|---|
| 00 00 | 00 FF | 00 91 | 00 00 |

| | | |
|---|---|---|
| 00 00 | 31 00 00 00 | 00 00 |

| | | | |
|---|---|---|---|
| 00 00 | 00 64 | 01 C8 | 00 64 | 00 00 |

| | | |
|---|---|---|
| 00 00 | FF 00 00 00 | 00 00 |

| | | |
|---|---|---|
| 00 00 | 90 00 00 00 | 00 00 |

| | | | | | |
|---|---|---|---|---|---|
| 00 00 | 00 32 | 02 64 | 01 64 | 02 32 | 00 64 | 00 00 |

| | | | | |
|---|---|---|---|---|
| 00 00 | 00 32 | 02 00 01 2C | 00 32 | 00 00 |

| | | |
|---|---|---|
| 00 00 | C8 00 00 00 | 00 00 |

| | | | | |
|---|---|---|---|---|
| 00 00 | 00 00 01 2C | 02 32 | 00 32 | 00 00 |

| | | | | |
|---|---|---|---|---|
| 00 00 | 00 45 | 02 7B | 00 00 00 00 | 00 00 |

| | | | | |
|---|---|---|---|---|
| 00 00 | 00 45 | 02 00 01 23 | 00 28 | 00 00 |

| | | |
|---|---|---|
| 00 00 | 00 00 01 90 | 00 00 |

| | | |
|---|---|---|
| 00 00 | 20 00 00 00 | 00 00 |

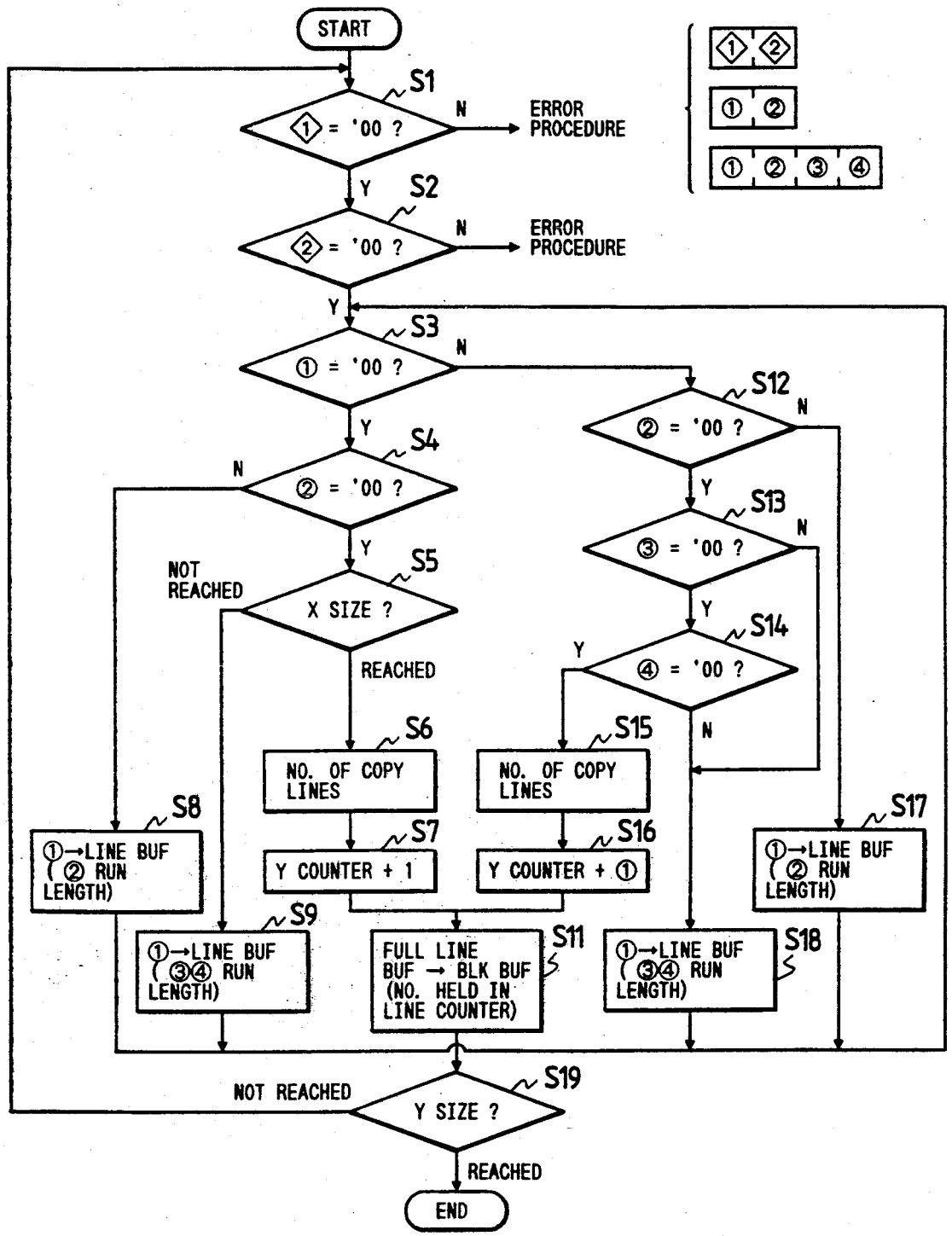

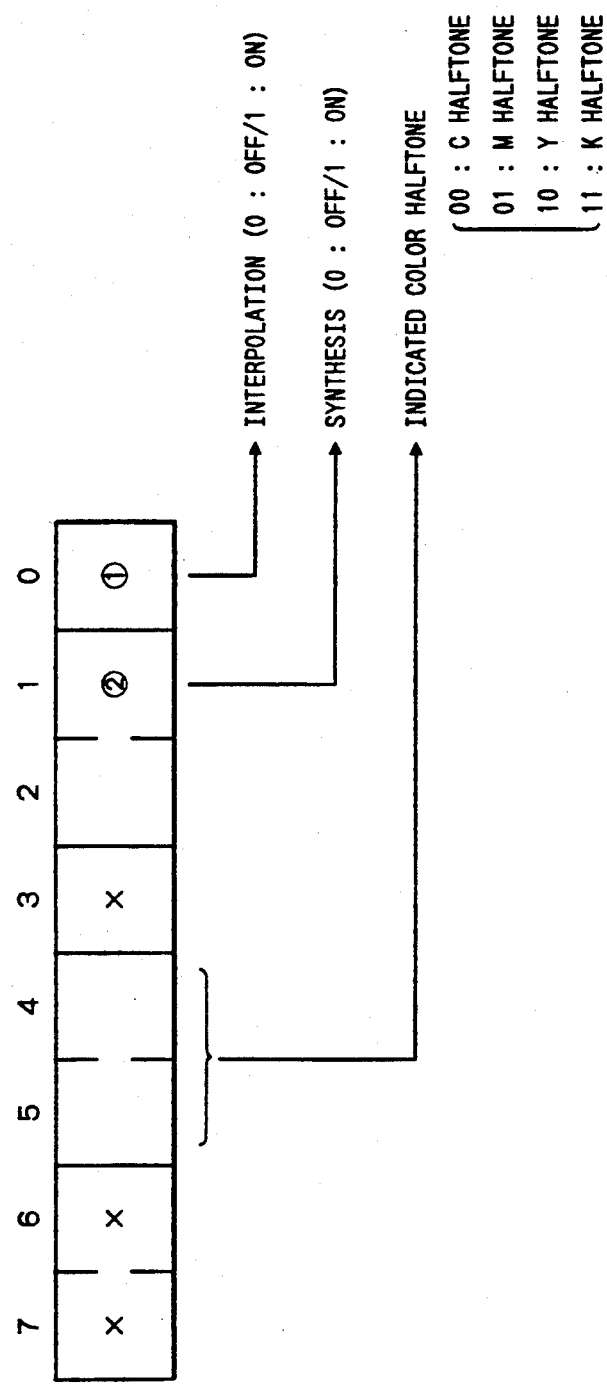

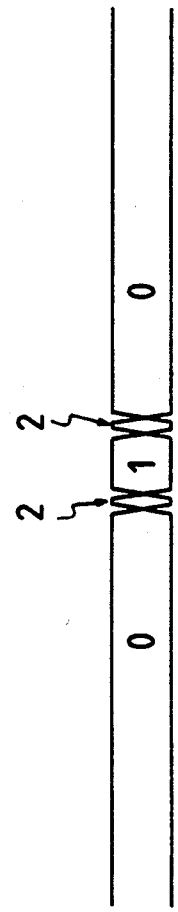
FIG. 15(a)
FIG. 15(b)

IMAGE SYNTHESIZING SYSTEM

BACKGROUND OF THE INVENTION

1. Field of the Invention

This invention generally relates to an image processing system and more particularly to an image synthesizing system for electronically synthesizing data representing an image from data representing bi-level characters, graphic forms and ground tints and data representing multi-level pictures such as photographs, which are inputted from a layout scanner of a computerized typesetting system (hereunder referred to simply as a CTS scanner) or what is called a multi-level picture scanner. Generally, bi-level characters and graphic forms such as illustrations and continuous-tone photographs and pictures mingle in printed matter (e.g., news papers and magazines). An image synthesizing system is used to obtain bi-level pictures from such halftone photographs and pictures and print the thus obtained bi-level pictures.

2. Description of The Related Art

There have been two kinds of conventional methods for synthesizing an image by inserting bi-level characters and graphic forms in a multi-level photograph or picture. In case of a first conventional method, bi-level characters and graphic forms to be inserted are cut out of a picture. Subsequently, the characters and the graphic forms are pasted up on the multi-level photograph. Finally, data representing a synthesized picture is obtained by performing a scan of the photograph by using a scanner. In contrast with this, in case of the other conventional method (hereunder referred to as a second conventional method), bi-level characters and graphic forms to be inserted and a multi-level photograph are first digitized separately from one another. Then, a synthesized picture is obtained by synthesizing or editing data representing the bi-level characters and graphic forms and data representing the multi-level photograph by using a computer.

The first conventional method was employed in, for example, a sporting newspaper company. In an office of the sporting newspaper company, many staffs cut headings, graphic forms and photographs or the like out of materials and effected a synthesizing or editing thereof. The first conventional method, however, has a drawback that other pictures, characters and graphic forms need preparing each time the size of a synthesized picture is changed (namely, each time the magnification or contraction of a picture to be obtained is required. To eliminate this drawback of the first conventional method, it has been desired to perform the synthesizing operation at a high speed and save labour by introducing a computer into an office. As a result of this, a system employing the second conventional method has come into use.

Incidentally, in case of the first conventional method, the bi-level characters and graphic forms thus inserted are not read as binary data but read as multi-level image data. Therefore, a part of a multi-level photograph or picture may be cut out and pasted up on another multi-level photograph.

In contrast, in case of the second conventional method, a photograph or picture and characters and graphic forms are electronically digitized by a color scanner. Then, only a necessary part of digital data obtained by the color scanner is extracted by using a man-machine interface. Further, a synthesizing/editing of a picture is performed by processing the digital data. Final results of the synthesizing/editing are converted into data representing an image composed of bi-level dots (hereunder referred to as binary halftone-dot data). A recording or printing of the synthesized picture is then effected in accordance with the binary halftone-dot data. Incidentally, binary data representing characters and graphic forms, which are digitized by an existent CTS scanner and are preliminarily converted into data representing portions each consisting of uniformly distributed dots of the same size (hereinafter referred to as screen-tint data), and binary picture data other than simple binary data may be employed as data representing characters and graphic forms. Examples of systems for converting data representing characters and graphic forms into screen-tint data are disclosed in Japanese Patent Application Provisional Publication Nos. 1-105743 and 1-13587 Official Gazettes. These systems, however, cannot insert bi-level characters and graphic forms into a multi-level picture.

Further, in case where the synthesized picture is recorded or printed as bi-level picture by performing the second conventional method, the multi-level photograph or picture is first converted into a bi-level image. Then, the thus obtained bi-level image and the bi-level characters and graphic forms are synthesized by executing a software program.

Thus, it is necessary for the conventional systems to temporarily store the data representing the multi-level photograph or picture, the binary halftone-dot data representing the result of the conversion of the data representing the multi-level photograph or picture thereinto, the data representing the bi-level characters and graphic forms to be inserted and sometimes the data obtained as the result of the synthesizing of the multi-level photograph and the bi-level characters and graphic forms. Therefore, an auxiliary storage having large storage capacity such as a magnetic disk is required. Moreover, in case where the sizes of the photograph, picture, characters and graphic forms of which data have been once read are changed, it is necessary to obtain data representing the photograph, picture, characters and graphic forms of which the sizes are increased or reduced. This takes much processing time in case where this processing is performed by executing the software program. Additionally, every change of the sizes of the photograph, picture, characters and graphic forms, it is necessary to perform the synthesizing/editing processing over again. The present invention is created to resolve these problems of the conventional system.

It is accordingly an object of the present invention to an image synthesizing system which can reduce storage capacity of an auxiliary storage such as a magnetic disk, can perform the functions of regulating the size of a synthesized image by effecting interpolation, expansion and contraction of a multi-level photograph or picture, of arbitrarily coloring and changing the colors of bi-level characters or graphic forms, of converting the multi-level photograph or picture and the bi-level characters and graphic forms into bi-level halftone-dot photograph (or picture), characters and graphic forms independently from one another, of arbitrarily indicating the number of halftone lines (hereunder referred to as a halftone line number) and a halftone-dot angle correspond to each region of the characters and graphic forms, of extracting arbitrary regions of the characters and graphic forms and synthesizing the extracted regions of the characters, the graphic forms and the multi-level photograph or picture and of outputting data representing a resultant synthesized image consisting of bi-level dots and can perform each processing at a high speed by implementing firmware.

SUMMARY OF THE INVENTION

To achieve the foregoing object and in accordance with the present invention, there is provided an image synthesizing system which comprises an interpolation circuit for interpolating data of neighboring pixels of a multi-level picture, a decompression circuit for converting data representing characters and graphic forms into data of pixels thereof, a first look-up table means for converting the data of pixels composing the characters and graphic forms into data representing gray levels (namely, gradation levels) of a four-color halftone (hereunder referred to as gradation level data), a second look-up table means for outputting control data for synthesis which includes two kinds of information (namely, halftone-dot pattern information used to indicate halftone-dot patterns corresponding to the characters and the graphic forms and region discriminating information used to indicate which of the characters and the graphic forms should be clipped), comparison circuits, which are independent of each other, respectively converting the multi-level picture and the bi-level characters and graphic forms into bi-level dot patterns (hereunder referred to as a multi-level picture comparison circuit and a bi-level element comparison circuit, respectively) and a selecting circuit for selectively outputting one of the bi-level dot patterns respectively corresponding to the bi-level characters and the bi-level graphic forms, thereby achieving the extraction of the characters and graphic forms to be inserted and the synthesizing the multi-level photograph and the extracted characters and graphic forms.

Namely, in the image synthesizing system provided with the above described configuration, the multi-level picture is first expanded to a desired size thereof by effecting the interpolation of data of neighboring pixels thereof in a primary and subordinate scanning directions by using the interpolation circuit. Then, in the decompression circuit, the data representing the characters and graphic forms, which is compressed by performing a run-length encoding method and is inputted thereto, is converted into data representing a sequence of region discriminating codes respectively corresponding to pixels. Next, the data representing the region discriminating codes is inputted to the first look-up table means and is further converted into gradation level data. Then, the control data including the halftone-dot pattern information and the region discriminating information is outputted from the second look-up table means. Subsequently, the multi-level picture comparison circuit inputs various halftone-dot pattern data from a memory storing halftone-dot patterns corresponding to the multi-level photograph or picture and data representing the result of the interpolation from the interpolation circuit and compares each of the inputted halftone-dot patterns with the inputted result of the interpolation. Then, the multi-level picture comparison circuit outputs data representing bi-level dot pattern data which corresponds to the multi-level photograph or picture. On the other hand, and the bi-level element comparison circuit inputs various halftone-dot pattern data from a memory storing halftone-dot patterns corresponding to the bi-level characters and graphic forms and the gradation level data and compares each of the inputted halftone-dot patterns with the gradation level data. Then, the bi-level element comparison circuit outputs data representing bi-level dot pattern data which corresponds to the bi-level characters and graphic forms. Thereafter, the selecting circuit inputs these two kinds of bi-level dot pattern data and selects one kind of the bi-level dot pattern data therefrom in accordance with the region discriminating information read from the second look-up table means.

Thus, the image synthesizing system according to the present invention does not need an auxiliary storage having large storage capacity such as a large capacity magnetic disk. Moreover, the image synthesizing system of the present invention can adjust the size of a photograph or picture to desired dimensions at a high speed by effecting interpolation, expansion and contraction of a photograph or picture by using firmware. Further, as described above, the image synthesizing system of the present invention is provided with two comparison circuits which are independent of each other and can obtain bi-level dot patterns corresponding to a multi-level photograph or picture and a bi-level character or graphic form, respectively, by using halftone-dot patterns different in halftone-dot angle and in halftone line number from each other. Furthermore, the image synthesizing system of the present invention can optionally color or change the colors of regions of characters and graphic forms inserted in a multi-level photograph or picture. Consequently, the extraction of one or more arbitrary pixels of characters and graphic forms, as well as the synthesizing of the extracted pixels of the characters and graphic forms and a multi-level photograph, can be performed at a high speed by using the firmware. Incidentally, even in case where halftone-dot patterns of bi-level characters and graphic forms are extracted and inserted into a multi-level photograph or picture, the synthesis of the halftone-dot patterns can be performed in the same manner.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 2 is a diagram for illustrating a run length encoding of data representing characters and graphic forms synthesized in the system of FIG. 1;

FIG. 5 is a diagram for illustrating examples of codes generated by the run length encoding correspondingly to the graphic form of FIG. 3;

FIG. 6 is a flowchart of a program for restoring characters and graphic forms, which is employed in the system of FIG. 1;

FIG. 11 is a diagram for showing an example of a format of data indicating modes of image synthesizing processing to be effected by the system of FIG. 1;

FIG. 15(a) is a diagram for illustrating change in level of data representing the typical line a of FIG. 14(a);

FIG. 15(b) is a diagram for illustrating change in level of data representing the typical line b of FIG. 14(b);

DETAILED DESCRIPTION OF THE PREFERRED EMBODIMENTS

Hereinafter, a preferred embodiment of the present invention will be described in detail by referring to the accompanying drawings.

Figure 1:
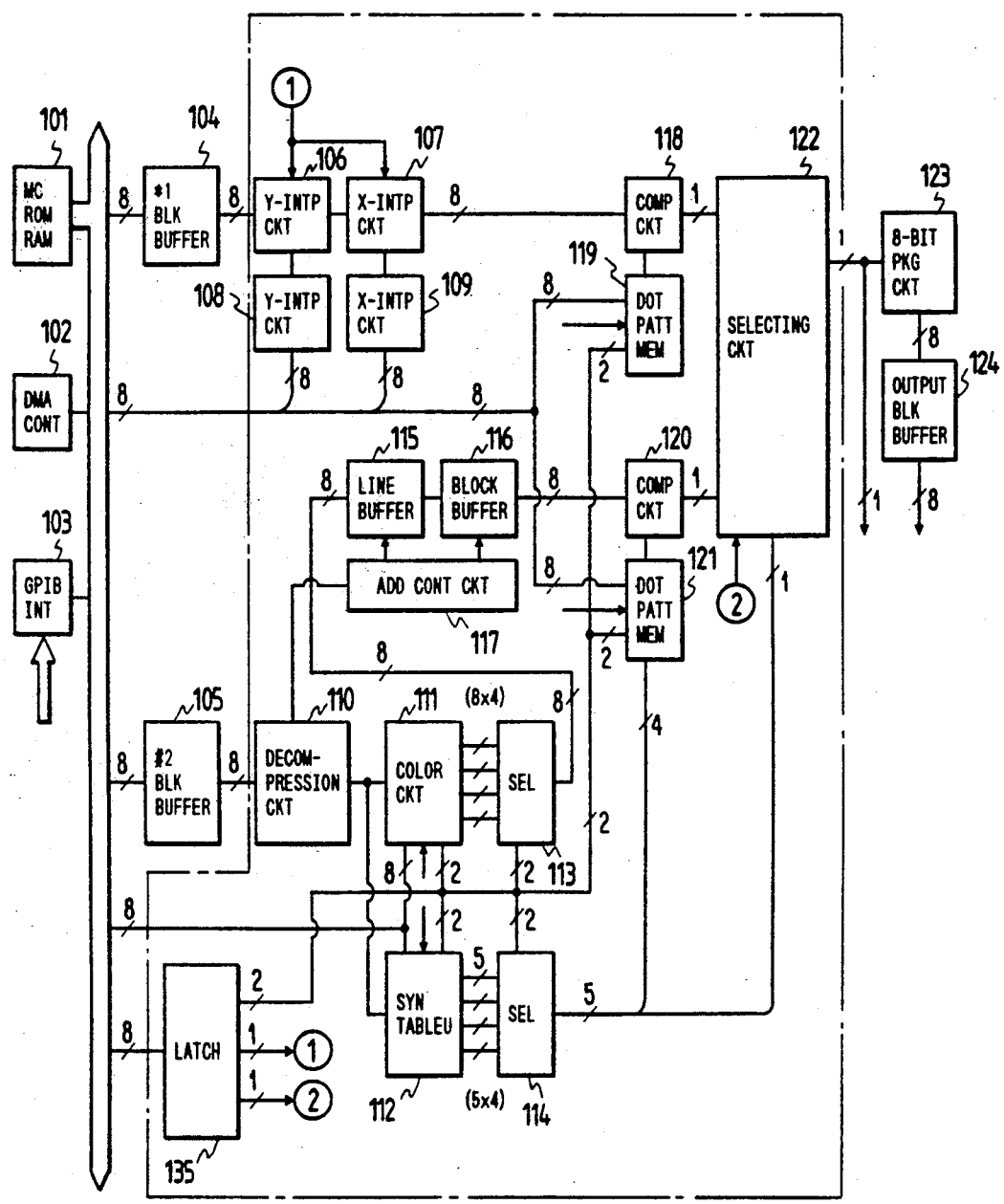
FIG. 1 is a schematic block diagram for showing an image synthesizing system embodying the present invention.

Referring first to FIG. 1, there is illustrated the construction of an image synthesizing system embodying the present invention. In FIG. 1, reference numeral 101 designates a microcomputer; 102 a direct memory access (DMA) controller; 103 an interface with a general purpose interface bus (hereunder referred to as a GIPB interface); 104 a block buffer memory for storing data representing a multi-level photograph or picture; 105 a block buffer for storing data representing data representing bi-level characters and graphic forms; 106 a line interpolation circuit for effecting an interpolation in a subordinate scanning direction; 107 a pixel interpolation circuit for effecting an interpolation in a primary scanning direction; 110 a decompression circuit for restoring data representing characters and graphic forms; 111 a first look-up table (hereunder sometimes referred to as a color look-up table) unit for storing gradation levels of a four-color halftone; 112 a second look-up table unit to be used for synthesizing image data; 115 a line buffer; 116 a block line buffer; 118 a multi-level picture comparison circuit for generating bi-level dot pattern data which corresponds to the multi-level photograph or picture; 119 a halftone-dot pattern memory for storing halftone dot patterns corresponding to a multi-level photograph or picture; 120 a bi-level element comparison circuit for generating bi-level dot pattern data which corresponds to characters and graphic forms to be inserted to the multi-level photograph or picture; 121 a halftone-dot pattern memory for storing halftone dot patterns corresponding to the character and graphic forms; 122 a selecting circuit for selectively outputting bi-level dot pattern data corresponding to the multi-level photograph or picture, characters and graphic forms; 123 a eight-bit packing circuit; and 124 a output block buffer.

Next, an operation of the image synthesizing system having the construction of FIG. 1 will be described in detail along data flow hereinbelow by referring to FIGS. 2 to 19.

First, a block of picture data representing a multi-level picture, which is inputted from an external circuit, are stored in the block buffer memory 104 through the GPIB interface 103 and the DMA controller 102 under the control of the microcomputer 101. On the other hand, a block of data representing characters and graphic forms to be inserted in the multi-level picture are stored in the block buffer memory 105 through a similar path. The data stored in the block buffer memories 104 and 105 are read therefrom in succession to be used in processing. Whenever another block of the data become necessary for the processing, this fact is notified to the microcomputer 101 which then causes the necessary block of the data to be inputted to the block buffer memory 104 or 105.

The picture data of two lines read in succession from the block buffer 104 are first inputted to the line interpolation circuit 106 for effecting an interpolation in a subordinate scanning direction (namely, the Y-direction or vertical direction of the multi-level picture). Then, the interpolation, expansion or contraction operations are effected in the line interpolation circuit 106. Subsequently, the data obtained in the line interpolation circuit 106 by effecting the interpolation is inputted to the pixel interpolation circuit 107 for effecting an interpolation in a primary scanning (X) direction (namely, in the horizontal direction of the multi-level picture). Then, an interpolation in the X-direction is performed in the pixel interpolation circuit 107 to obtain a new pixel having an intermediate gray level between each pair of adjacent pixels of the inputted block. Incidentally, the interpolation effected in each of the X and Y directions is linear interpolation. Further, a thinning-out table necessary for the interpolation effected in each of the X and Y directions is preliminarily generated in accordance with an interpolation magnification or contraction ratio and is established in an interpolation map memory 108 or 109.

To effect the linear interpolation, interpolation data corresponding to each pair of adjacent pixels arranged on a line or adjacent pixels respectively placed at corresponding positions of two adjoining lines of the picture is preliminarily set in the interpolation map memory 108 or 109 by using a fixed magnification ratio (e.g., 32 in this embodiment) in case of each of the primary and subordinate scans. When performing the interpolation, an interpolation increment corresponding to adjoining pixels of each pair is read from the thinning-out table by referring thereto by using thinning-out table data indicating a difference between gradation levels of the adjoining pixels of each pair and sampling positions as addresses to be read, and data of a new pixel to be inserted to the adjoining pixels of each pair is calculated by adding the read interpolation increment to original data of the pixels. The further details of this interpolation is described in the Japanese Patent Application Provisional Publication No. 1-80168 Official Gazette. For example, in case that the fixed magnification ratio is 32 and the interpolation magnification ratio is 5/3, the thinning-out table data ik are determined correspondingly to a parameter k indicating the order of output data and repeatedly having values of 0, 1, 2, 3 and 4 in this order and to another parameter $\epsilon$ indicating the timing of updating input data as follows:

k=0, 1, 2, 3, 4

$\epsilon$=0, 0, 1, 0, 1 ik=0, 19, 2, 26, 13.

Incidentally, if $\epsilon$=1, input data is updated prior to the processing. In contrast, if $\epsilon$=0, input data is not updated before the processing.

In this way, the interpolation processing is performed according to the thinning-out data and the result thereof is inputted to the multi-level picture comparison circuit 118.

On the other hand, the data stored in the block buffer memory 105, which represent characters and graphic forms to be inserted and will be briefly described hereinafter, are color line art data which are in conformity with a standard (ANSI It8. 2-1988; [UEF01]) fixed by the American National Standards Institute.

Figure 3:
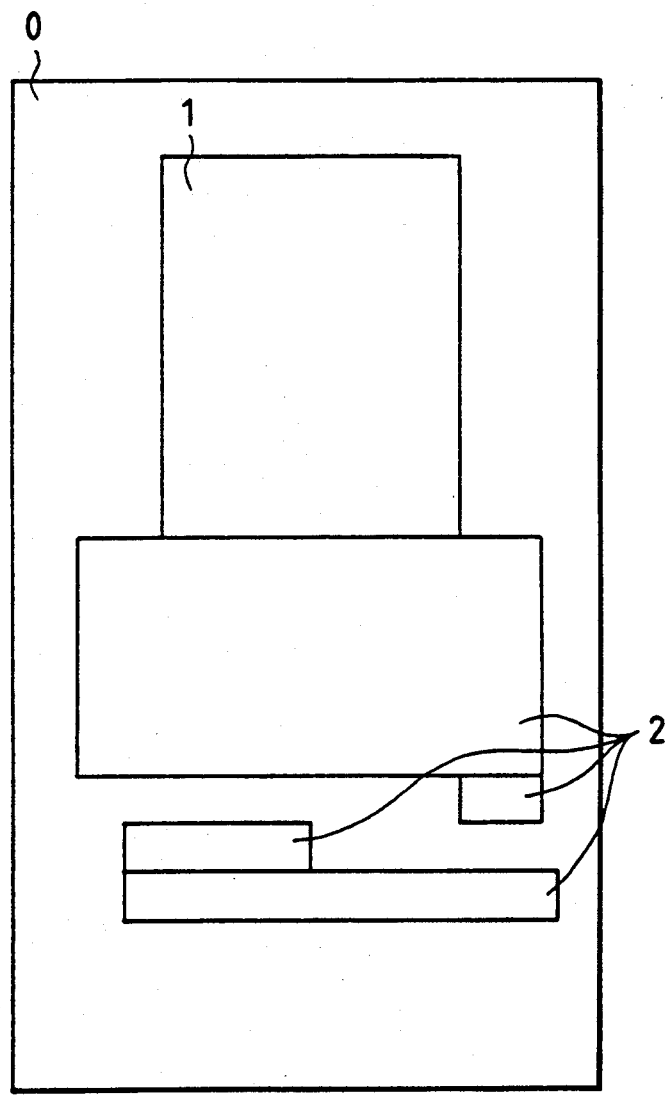
FIG. 3 is a diagram showing an example of data representing a graphic form for illustrating a conception of the run length encoding of FIG. 2.
Figure 4:
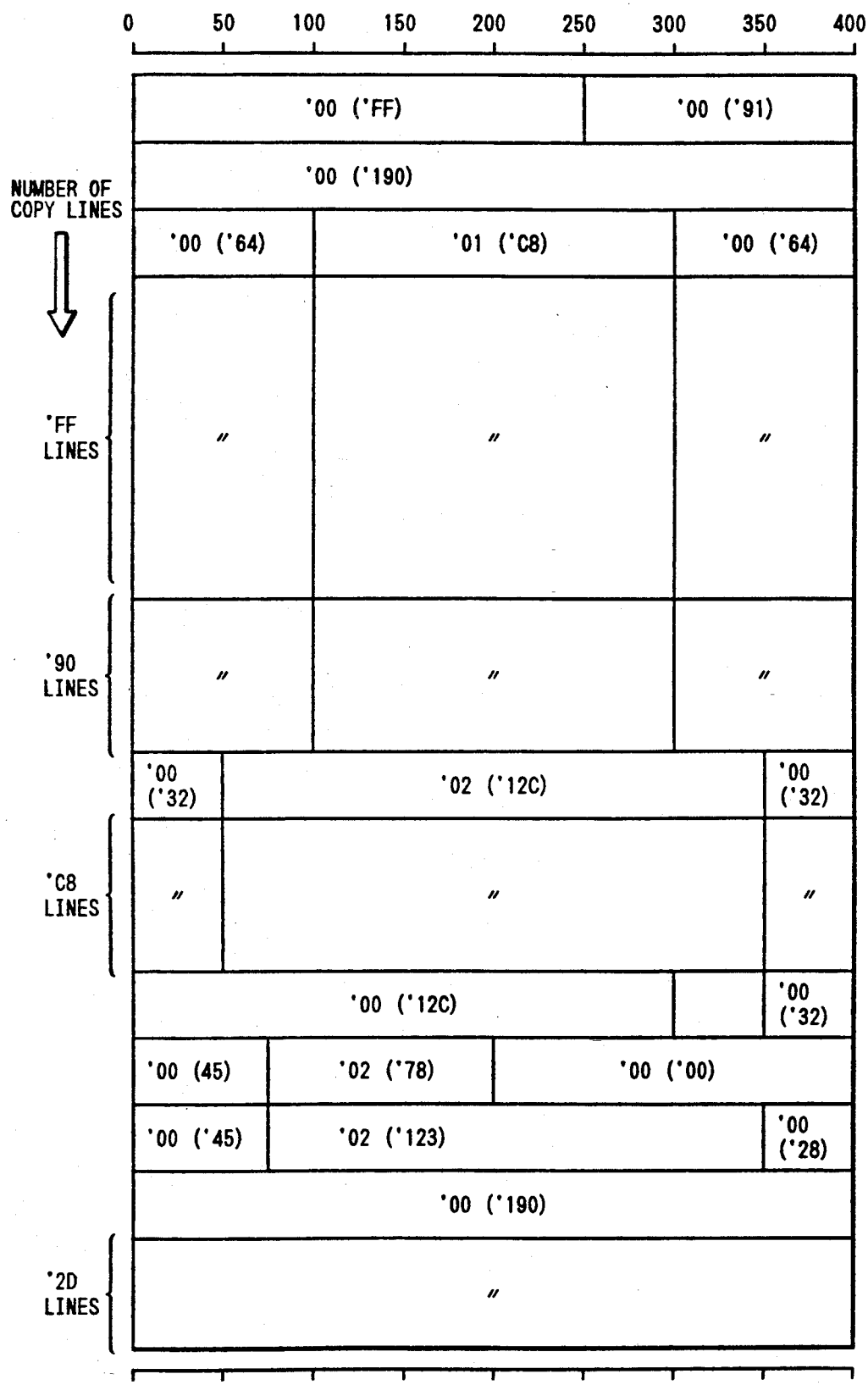
FIG. 4 is a diagram for illustrating formats of codes to be generated by the run length encoding correspondingly to the graphic form of FIG. 3.

This standard (hereunder sometimes referred to as the UEF01 standard) is set to enable data exchange among Color Electric Prepress Systems (CEPS) using magnetic tapes (MT) as media. Here, the color line art data is data compressed by the run length encoding and represents a multicolor character or graphic form by using a pair of a color code which is used as a discriminating code for discriminating what region each pixel belongs to, and its run length. According to the above described standard, colors corresponding to color codes of from 1 to 255 can be basically employed, but a color corresponding to a color code of 0 cannot be employed. This embodiment, however, is adapted to be able to employ the color corresponding to the color code of 0. FIG. 2 illustrates data format employed for the run-length encoding according to the UEF01 standard extended as described above in such a manner to include a color corresponding to color code of 0. A line starting and terminating codes each having a hexadecimal value [0000] which are two bytes long are set at a starting and terminating ends of data of one line, respectively. Incidentally, in the instant specification, the notation [A] indicates that a numeral A is in hexadecimal representation. Further, codes (hereunder referred to as run-length encoding codes) of one line, which are obtained by effecting the run length encoding, are held in a part, which intervenes between the hexadecimal values [0000] at both ends of the data (namely, the run-length encoding codes of one line). Moreover, there are two types of the data format, namely, a short and long formats. In case of using the short data format, codes of which the run lengths range from 1 to 255 can be represented. However, in case of using the long data format, codes of which the run lengths range from 1 to 32767 can be represented. Incidentally, in case where a plurality of lines have the same data (namely, the same run-length encoding codes) as a line immediately prior to these lines has, a line copying code indicating the number of lies having the same data as shown in FIG. 2 is used. For instance, in case of graphic forms of which each pixel has a region discriminating code (namely, a color code) of 0, 1 or 2 as illustrated in FIG. 3, the run-length encoding is effected as illustrated in FIG. 4. In FIG. 5, there is shown a run-length encoding code obtained as the result of this run-length encoding operation. This resultant data indicating the graphic forms of FIG. 3 is stored in the block buffer memory 105. Referring next to FIG. 6, there is shown a flowchart of a program for restoring the region discriminating code of each pixel from the run-length encoding code of FIG. 5, based on the data format of FIG. 2. As illustrated in FIG. 6, a line starting code of data of each line (namely, a hexadecimal code [0000] which is two bytes in length) is first detected by making decisions in steps S1 and S2. Then, if it is found in step S3 that a first byte of input data is not equal to [00], this byte is determined to be a color code. Further, if it is found in step S12 that the next byte is equal to [00], the system judges that the long data format is used and the next two bytes represent the run length of the code. In contrast, if it is found in step S12 that the next byte is not equal to [00], the system judges that the short data format is used and the next byte represents the run length of the code. Then, the color codes of the number which is equal to the run length are repeatedly outputted from the decompression circuit 110 and are stored in the line buffer 115. On the other hand, if it is found as a result of decisions in steps S12, S13 and S14 that three bytes subsequent to the first byte are equal to [000000], the system judges that this data represents a copy code. In this case, the value of the code determined in step S3 is further determined to be the number of lines (hereunder sometimes referred to as copy lines) having the same data (namely, the number of repetition) and the line buffer outputs the data of lines of the number of repetition in succession. Then, the output data are stored in the block buffer. In contrast, if the first byte of the input data is [00] and the next byte is not equal to [00], the system judges that the short data format is used and a value represented by the second byte of the input data is determined to be the run length. If each of the first and second bytes is equal to [00] and the number of the color codes already outputted does not reach the size of one line in the primary scanning direction (namely, in the X-direction), it is judged that the long data format is used and the number of the color codes already outputted is determined to be the run length. Further, the color codes of the color codes [00] of the number equal to the run length are repeatedly outputted and are stored in the line buffer. However, if each of the first and second bytes is equal to [00] and the number of the color codes already outputted reach the size of one line in the primary scanning (X—) direction, it is judged that the line terminating code is detected and the number of lines of which data should be copied is one. Thus, the data of one line restored by that time is copied onto the block buffer. The above described processing is performed every time run-length encoding codes or data are inputted to the system. Turning back to FIG. 1, the region discriminating codes (i.e., the color codes) of one line among the data representing the characters or graphic forms, which are stored in the block buffer 105 and are compressed by effecting the run-length encoding, are restored in the manner as described by referring to FIG. 6. Thereafter, the restored codes are inputted to the line buffer 115 through the color look-up table unit 111 and the selecting circuit 113. Then, an output of the line buffer 115 is inputted to the block buffer 116. When a copy code is detected in the sequence of the data of lines outputted from the line buffer 115 for storing data of one line, the number of copy lines is inputted from the decompression circuit 110 to an address control circuit 117. Further, when a line terminating code is detected, the number of copy lines (namely, 1 in this case) is similarly inputted to the address control circuit 117. Then, the address control circuit 117 repeatedly performs operations of reading data of one line from the line buffer 115 in accordance with the inputted number of the copy lines and outputting the read data to the block buffer 116. The copying of data from the line buffer 115 to the block buffer 116 and the restoration processing in the decompression circuit 110 are timely controlled in such a manner to be halted for a time when the block buffer 116 become full until some data is read from the buffer 116 to be used in the processing to be effected in the comparison circuit 120. As described previously, the color look-up table unit 111 is provided posterior to the decompression circuit 110 and outputs gradation levels of a four-color halftone, namely, one of a cyanic halftone (a C halftone), a magenta halftone (an M halftone), a yellow halftone (a Y halftone) and a black halftone (a K halftone) in accordance with the region discriminating codes (i.e., the color codes) outputted form the decompression circuit 110. Next, a selecting circuit 113 selects the gradation levels of the four-color halftone preliminarily indicated and outputs the gradation levels of the selected halftone to the selecting circuit 122 for selectively outputting bi-level dot pattern data corresponding to the multi-level photograph or picture.

Figure 7A:
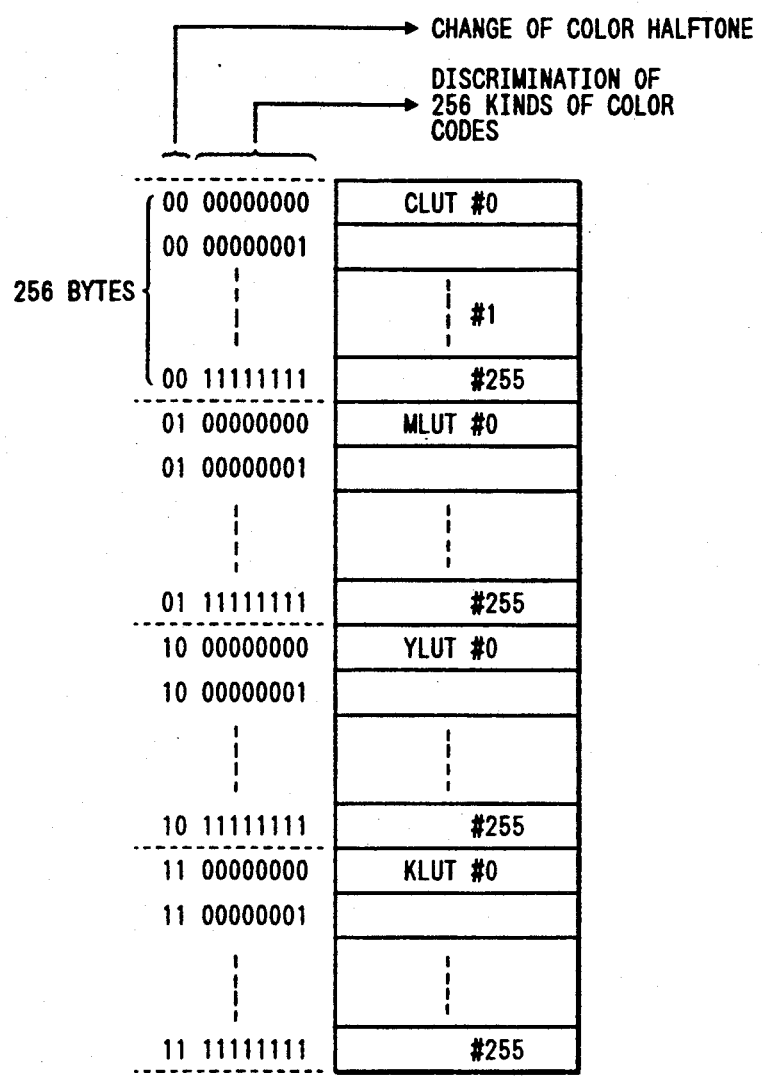
FIG. 7($a$) is a diagram for illustrating an example of the construction of a color look-up table corresponding to a multi-level photograph or picture, which is employed in the system of FIG. 1.
FIG. 7(b) is a diagram for illustrating an example of a format employed to represent gradation levels of color codes of each color component of a four-color halftone.
Figure 7B:
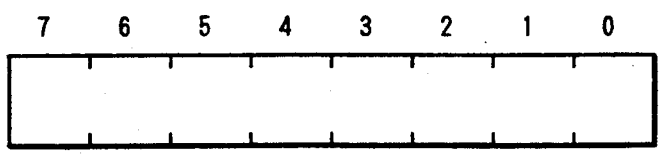

Incidentally, the color look-up table unit 111 is made up of a random access memory (RAM) which is readable and writable. The contents of the color look-up table unit are preliminarily set before the processing is performed. Further, a read-only memory (ROM) may be used as the color look-up memory 111 in case that there is no need of changing the contents thereof. As is seen from a memory map of FIG. 7(a), data representing 256 gradation levels, each of which is represented by one byte, of each of the C, M, Y and K halftones are continuously stored in the color look-up table unit 111. Two high order bits of data representing a reading address indicate kinds of the four-color halftone (i.e., the C, M, Y and K halftones) and on the other hand eight low order bits thereof indicate gradation levels corresponding to the region discrimination codes (i.e., the color codes) of each pixel. FIG. 7(b) illustrates 1-byte data representing a gradation level of which the value ranges from 0 to 255.

Figure 8A:
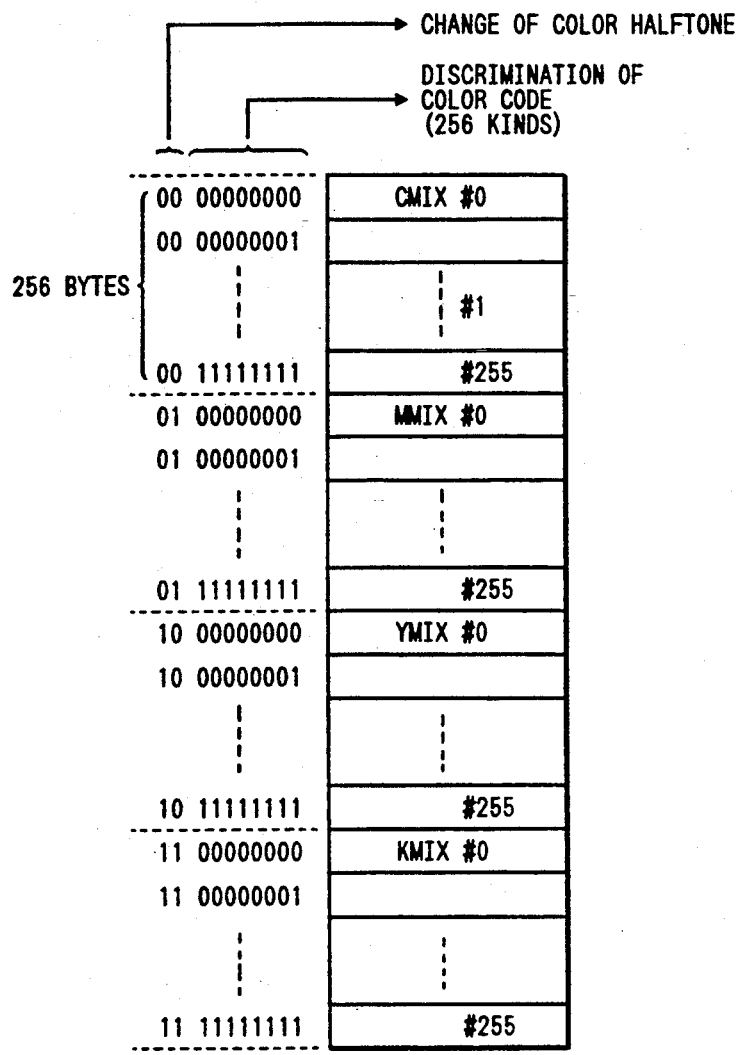
FIG. 8(a) is a diagram for illustrating the construction of an example of a look-up table used for synthesizing characters and graphic forms, which is employed in the system of FIG. 1.
Figure 8B:
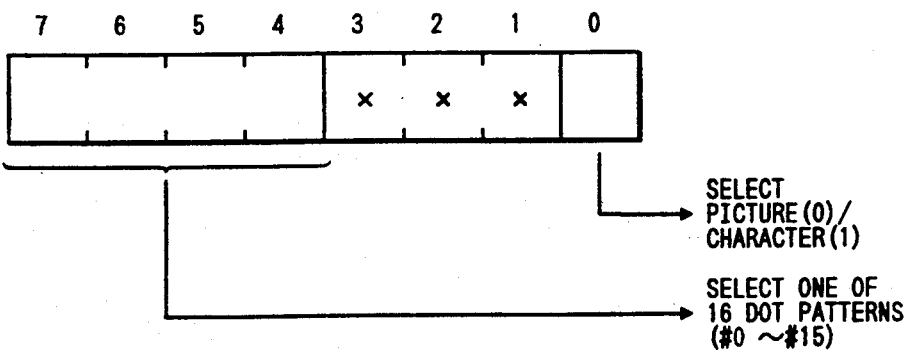
FIG. 8(b) is a diagram for illustrating a format of control data used in the look-up table of FIG. 8(a)

Referring next to FIG. 8(a), there is shown a memory map of the look-up table unit 112. As is seen from this figure, data representing 256 gradation levels of the C, M, Y and K halftones are stored in the look-up table unit 112 in this order from a leading address thereof. Data representing each reading address of the look-up table unit 112 has the same structure of the data representing each reading address of the unit 111. Namely, two high order bits of data representing a reading address indicate kinds of the four-color halftone (i.e., the C, M, Y and K halftones). However, eight low order bits thereof are used to select control data (hereunder referred to as synthesis control data) for controlling a synthesizing operation. FIG. 8(b) illustrates the structure of the 1-byte control data of FIG. 8(a). Four high order bits of the control data are used to select a desired kind of bi-level dot patterns of the characters and graphic forms. Lowest order bit thereof is used to selectively output data representing the picture or data representing the characters and graphic forms. Thus, in accordance with the inputted region discriminating code (or color code), a dot pattern is selected from sixteen kinds of the dot patterns #0 to #15, and either the picture is selected or the characters and graphic forms are. Further, corresponding control data is generated. In the embodiment of FIG. 1, only data corresponding to the preliminarily indicated color halftone is selected by a selecting circuit 114 according to the synthesis control data outputted from the look-up table unit 112 and is outputted from the circuit 114. Data represented by four high order bits of the synthesis control data is inputted to the pattern memory 121 for storing halftone dot patterns corresponding to the character and graphic forms. Data represented by the lowest order bit of the synthesis control data is inputted to a selecting circuit 122. The data stored in the pattern memories 119 and 121 will be described later.

As described above, the bi-level dot pattern data generated in the comparison circuit 118 corresponding to the photograph or picture, as well as the bi-level dot pattern data generated in the comparison circuit 118 corresponding to the characters and graphic forms, is inputted to the selecting circuit 122. In case where selection information represented by the lowest order bit of the synthesis control data indicates 0, the bi-level dot pattern data corresponding to the photograph or picture is selected and outputted from the selecting circuit 122 to the eight-bit packing circuit 123. In contrast, in case where selection information represented by the lowest order bit of the synthesis control data indicates 1, the bi-level dot pattern data corresponding to the characters and graphic forms is selected and outputted from the selecting circuit 122 to the circuit 123. In the eight-bit packing circuit 123, bi-level data representing the result of synthesizing the photograph or picture and the extracted characters and graphic forms is partitioned into groups of 8-bits thereof. Then, a serial/parallel conversion of such 8-bit data is effected therein. The results of the serial/parallel conversion are successively stored in the output block buffer 124. If necessary, the 8-bit packing circuit 123 can output the bi-level data representing the result of the synthesis in what is called a bit-serial manner. The data stored in the output block buffer 124 is sent to an external printing device such as a laser beam printer (LBP) and the resultant picture is printed by the printing device.

Figure 9A:
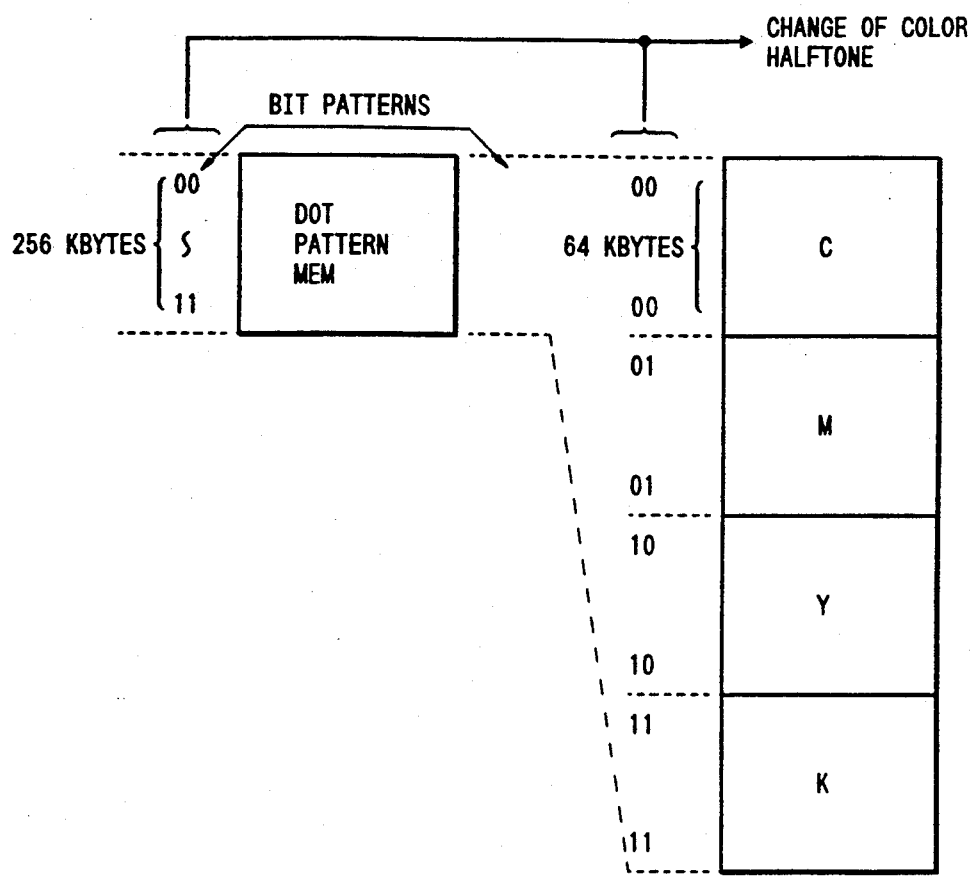
FIG. 9(a) is a diagram for illustrating the construction of an example of a halftone-dot pattern memory corresponding to a multi-level photograph or picture.
Figure 9B:
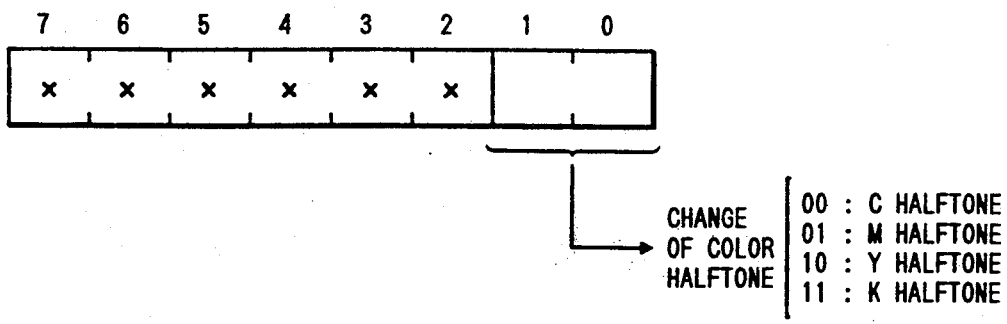
FIG. 9(b) is a diagram for illustrating a format of control data used for selecting one of parts of the halftone-dot pattern memory of FIG. 9(a) correspondingly to one of color components of a four-color halftone.
Figure 10A:
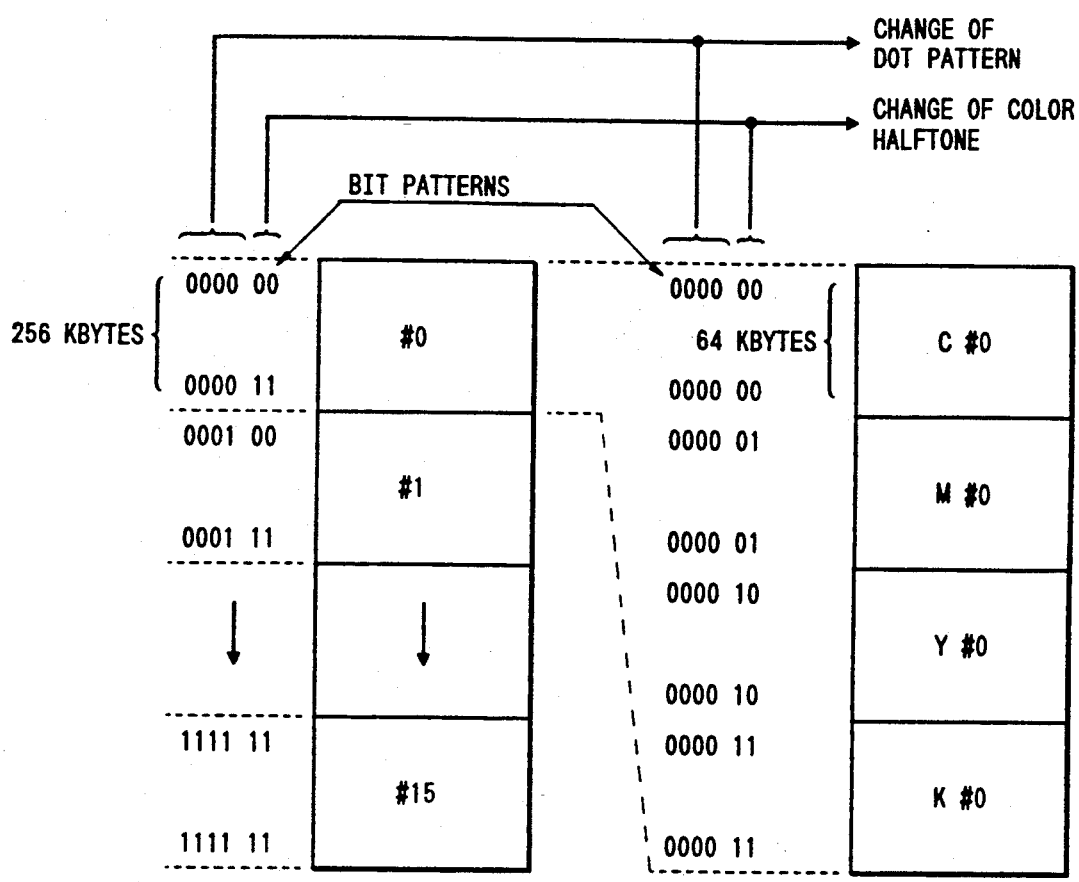
FIG. 10(a) is a diagram for illustrating the construction of an example of a halftone-dot pattern memory corresponding to characters or graphic forms.
Figure 10B:
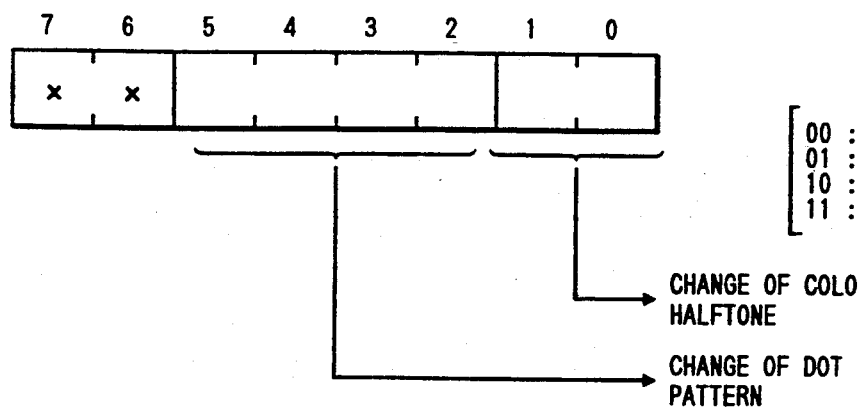
FIG. 10(b) is a diagram for illustrating a format of control data used for selecting one of parts of the halftone-dot pattern memory of FIG. 10(a) correspondingly to one of color components of a four-color halftone.

Hereinafter, the contents of the memories 119 and 121 will be described. FIGS. 9(a) and 9(b) are diagrams for illustrating the contents of the halftone-dot pattern memory 119 for storing the halftone dot patterns corresponding to the multi-level photograph or picture. The halftone dot patterns corresponding to the multi-level photograph or picture are two-dimensional arrays, each of which uses a storage area of 64 K bytes, composed of halftone dots of 256×256 corresponding to the C, M, Y and K halftones which are stored in this order in a storage area of 256 K bytes of the memory 119 as illustrated in FIG. 9(a). The selected one of the C, M, Y and K halftones is preliminarily indicated prior to the processing as above described. Further, dot pattern reading address data shown in FIG. 9(b) includes two bits indicating binary values "00", "01", "10" and "11" respectively corresponding to the dot patterns of the C, M, Y and K halftones. FIGS. 10(a) and 10(b) are diagrams for illustrating the contents of the halftone-dot pattern memory 121 for storing the halftone dot patterns corresponding to the bi-level characters and graphic forms. FIG. 10(a) shows a memory map of the memory 121. Further, FIG. 10(b) shows the contents of dot pattern reading address data. Similarly as in case of the memory 119, the halftone dot patterns corresponding to the bi-level characters and graphic forms are two-dimensional arrays, each of which uses a storage area of 64 K bytes, composed of halftone dots of 256×256 corresponding to the C, M, Y and K halftones which are stored in this order in a storage area of 256 K bytes of the memory 121, as shown in FIG. 10(a). Each of the 16 kinds of the dot patterns #0 to #15 can be established to have four sub-patterns, which have the same arrangement of dots and are stored in a storage area of 256 K bytes of the memory 121 but are different in color of dots from one another, corresponding to the C, M, Y and K halftones, respectively. Incidentally, the system can work if at least one kind of the dot patterns (e.g., #0) having four sub-patterns is provided therein within a permitted limit of the storage capacity of the memory 121. Thus, it is necessary for selecting a sub-pattern to preliminarily indicate one of the C, M, Y and K halftones and one of the 16 kinds of the dot patterns (#0 to #15). However, one of the C, M, Y and K halftones is indicated by the lowest two bits of dot pattern reading address data of FIG. 10(b). Namely, the C, M, Y and K halftones are indicated by binary values "00", "01", "10" and "11" represented by the lowest two bits, respectively. Further, a value represented by four bits subsequent to the lowest two bits and having orders higher than the lowest two bits indicate one of the 16 kinds of dot patterns (#0 to #15).

As stated above, it is necessary to preliminarily set various parameters and units (e.g., the interpolation map memories, the color look-up table unit, the look-up table unit for the synthesis and the dot pattern memories). Additionally, a processing color halftone mode, an interpolation on/off mode and a synthesis processing on/off mode should be set in a mode setting latch 135 in the form of FIG. 11. As shown in FIG. 11, the processing color halftone mode indicating a color halftone to be used in the processing is represented by two bits having bit positions 4 and 5. Further, the interpolation on/off mode indicating whether or not an interpolation of data representing the multi-level photograph or picture should be performed is represented by a bit having a bit position 0. Furthermore, the synthesis on/off mode indicating whether or not a synthesis of data representing the multi-level photograph or picture and data representing the characters and graphic forms should be performed is represented by a bit having a bit position 1. In case where the interpolation on/off mode is an off-mode, the interpolation is not effected and data read from the block buffer 104 of FIG. 1 is inputted to the comparison circuit 118 without being changed. On the other hand, the synthesis processing on/off mode is inputted to the selecting circuit 122. If the synthesis processing on/off mode indicates an off-mode, the selecting circuit 122 always selects the bi-level dot pattern data corresponding to the photograph or picture. As explained above, the kind of the color halftone indicated by the processing color halftone mode of FIG. 11 is inputted to the color look-up table unit 111, the selecting circuit 113, the table unit 112, the selecting circuit 114, the memories 119 and 121. The thus indicated color halftone is employed.

Figure 12A:
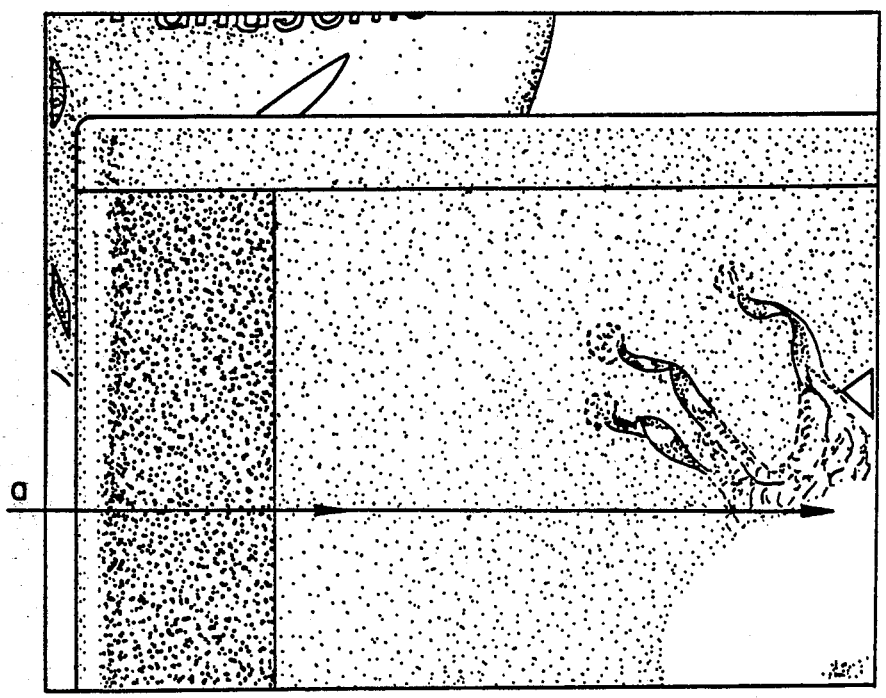
FIG. 12(a) is a diagram for illustrating halftone dot data representing the photograph or picture, which is used in the system of FIG. 1.
Figure 12B:
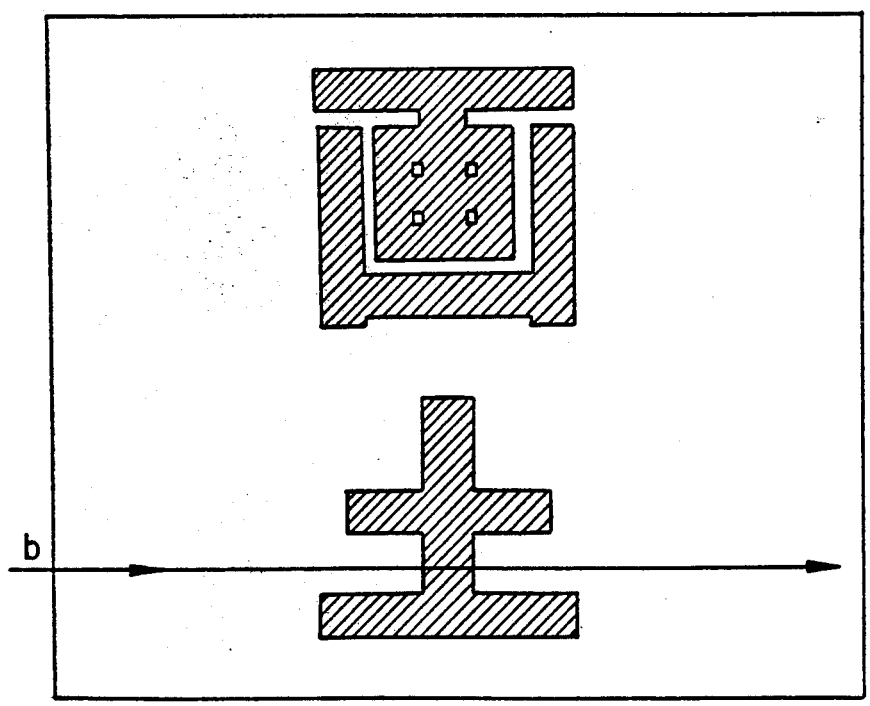
FIG. 12(b) is a diagram for illustrating halftone dot data representing the characters and graphic forms, which is used in the system of FIG. 1.
Figure 13A:
FIG. 13(a) is a waveform chart for illustrating densities of pixels of a typical line a of the multi-level photograph or picture, which is shown in FIG. 12(a)
Figure 13B:
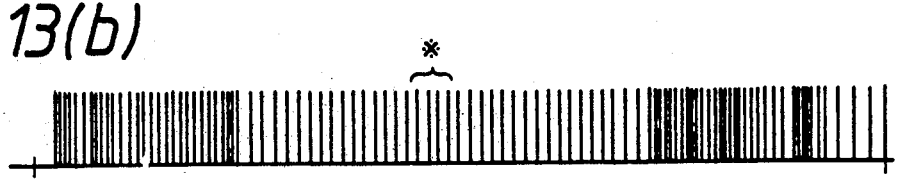
FIG. 13(b) is a diagram for illustrating bi-level dot data of the typical line a of the multi-level photograph or picture.
Figure 13C:
FIG. 13(c) is an enlarged view of a part of the line a which is indicated by a mark * in FIG. 13(b)
Figure 13D:
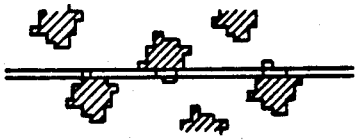
FIG. 13(d) is a diagram for illustrating a part of the bi-level dot data corresponding to the part indicated by the mark *, which is shown in FIG. 13(b)
Figure 13E:
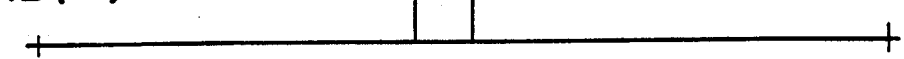
FIG. 13(e) is a diagram for illustrating bi-level data corresponding to a line b of data representing the characters and graphic forms, which is shown in FIG. 12(b)

Next, the above described image synthesizing processing of practical examples of the photograph or picture and the characters and graphic forms will be described by referring to FIGS. 12 to 19. FIG. 12(a) shows halftone-dot image, which is represented by the data outputted by the block buffer 116 of FIG. 1 and inputted to the comparison circuit 120, of the multi-level photograph after the interpolation is effected. FIG. 12(b) shows bi-level dot image, which is represented by the data outputted by the block buffer 116 of FIG. 1 and inputted to the comparison circuit 120, of the characters and graphic forms to be inserted into the picture of FIG. 12(a). The data of FIG. 12(b) employs the gradation levels stored in and outputted from the color look-up table unit 111. In this example, the background is represented by the gradation level 0 (i.e., a white level) and the characters are represented by the gradation level 255 (i.e., a black level). FIGS. 13(a), 13(b), 13(c), 13(d) and 13(e) are diagrams for illustrating portions of the picture of FIGS. 12(a) and 12(b). FIG. 13(a) is a waveform chart for illustrating densities of pixels of a typical line a of the multi-level photograph or picture, which is shown in FIG. 12(a), just before converted into a bi-level dot image. FIG. 13(b) is a diagram for illustrating bi-level dot data of the typical line a of the multi-level photograph or picture of FIG. 12(a). FIG. 13(c) is an enlarged view of a part of the line a which is indicated by a mark * in FIG. 13(b). FIG. 13(d) is a diagram for illustrating a part of the bi-level dot data corresponding to the part of FIG. 13(c) indicated by the mark *, which is shown in FIG. 13(b). FIG. 13(e) is a diagram for illustrating bi-level data corresponding to a line b of data representing the characters and graphic forms, which is shown in FIG. 12(b)

Figure 14A:
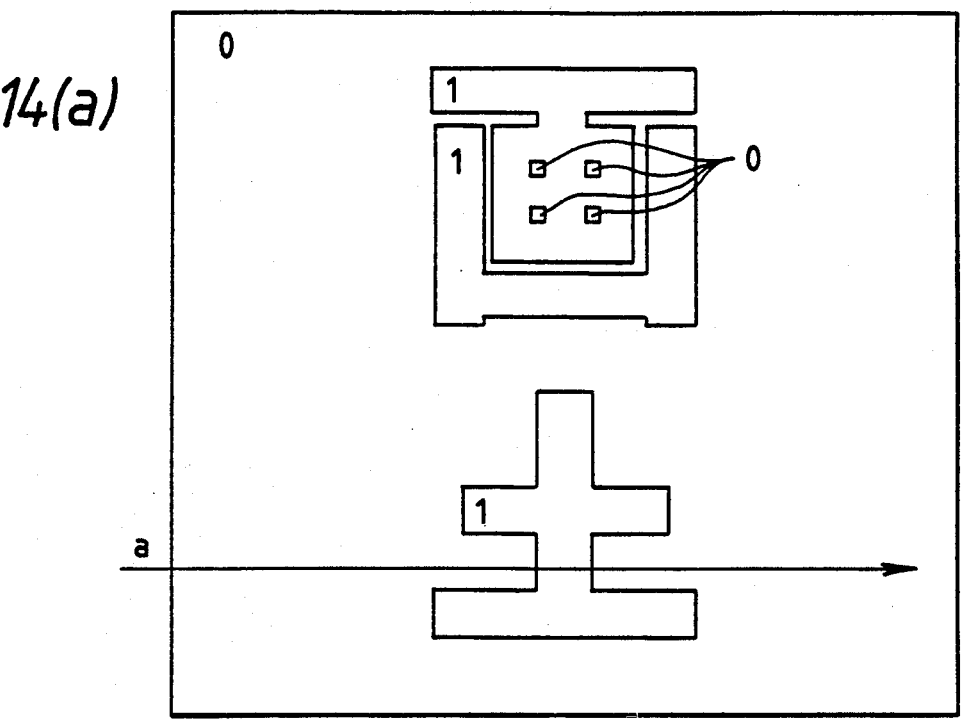
FIG. 14(a) is a diagram for illustrating color codes restored from data generated by the run length encoding correspondingly to characters.
Figure 14B:
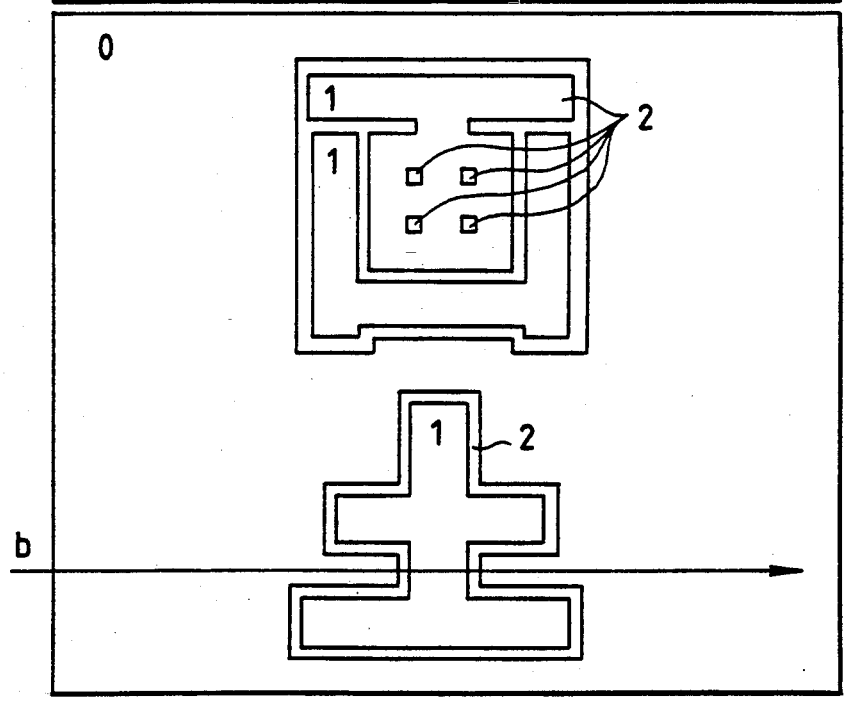
FIG. 14(b) is a diagram for illustrating color code data representing of the characters of FIG. 14(a), which are hemmed by white frames.

Referring next to FIGS. 14(a) and 14(b), there are shown data outputted from the decompression circuit 110 of FIG. 1. Further, the data represent the region discriminating codes (i.e., the color codes) restored by the decompression circuit 110 from the run-length encoding codes outputted from the block buffer 105. Further, FIGS. 14(a) and 14(b) show different example of such data. In data of FIG. 14(a), two kinds of the color codes, namely, color code 0 indicating the background and color code 1 indicating the characters are used. A coloring operation is performed according to these color codes 0 and 1 by using the color look-up table unit 111 of FIG. 1. As above described, one of the C, M, Y and K halftones is previously selected and the gradation levels of the selected halftone are already outputted therefrom. In data of FIG. 14(b), three kinds of the color codes, namely, the color codes 0 and 1 and color code 2 indicating the frames which hem the characters are used. The edition such as modification and conversion of the color code data of FIGS. 14(a) and 14(b) are effected in an external work station (WS) (not shown) connected to the image synthesizing system of FIG. 1.

FIG. 15(a) illustrates change in level of data representing the typical line a of FIG. 14(a); and FIG. 15(b) shows change in level of data representing the typical line b of FIG. 14(b). In case of the color data of FIG. 15(a), the color code changes from 0 (corresponding to the background) to 1 (corresponding to the characters) and further changes from 1 to 0 again in the direction from left to right as viewed in this figure. On the other hand, in case of the color data of FIG. 15(b), the color code changes from 0 (corresponding to the background) to 2 (corresponding to the frames of the characters) and then changes from 2 to 1 (corresponding to the characters) and further changes from 1 to 0 in the direction from left to right as viewed in this figure. The conversion of edition of the color codes of these figures are effected by the WS as above stated.

Next, practical examples of the image synthesizing processing of the photograph or picture of FIG. 12(a) and the characters and graphic forms of FIGS. 14(a) and 14(b) will be described in the following cases:

(1) the gradation levels of the C, M, Y and K halftones corresponding to the color code 0 of FIG. 14(a) are set to be 0, 0, 0 and 0, respectively, and those of the C, M, Y and K halftones corresponding to the color code 1 of FIG. 14(a) are set to be 255, 255, 255 and 255, respectively; and (2) the gradation levels of the C, M, Y and K halftones corresponding to the color code 0 of FIG. 14(a) are set to be 0, 0, 0 and 0, respectively, and those of the C, M, Y and K halftones corresponding to the color code 1 of FIG. 14(a) are set to be 64, 64, 64 and 64, respectively.

Further, practical examples of the image synthesizing processing of the photograph or picture of FIG. 12(a) and the characters and graphic forms of FIGS. 14(a) and 14(b) will be described in the following cases:

(3) the gradation levels of the C, M, Y and K halftones corresponding to each of the color codes 0 and 2 of FIG. 14(b) are set to be 0, 0, 0 and 0, respectively, and those of the C, M, Y and K halftones corresponding to the color code 1 of FIG. 14(b) are set to be 255, 255, 255 and 255, respectively; and (4) the gradation levels of the C, M, Y and K halftones corresponding to the color codes 0 and 2 of FIG. 14(b) are set to be 0, 0, 0 and 0, respectively, and those of the C, M, Y and K halftones corresponding to the color code 1 are set to be 64, 64, 64 and 64, respectively.

Figure 16A:
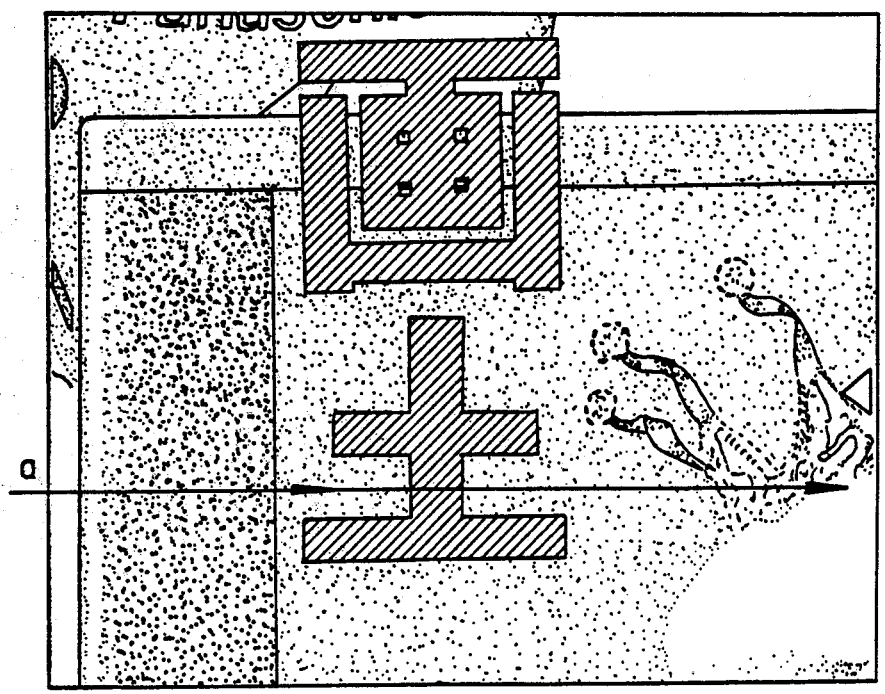
FIG. 16(a) is a diagram for illustrating a first example of the result of the synthesizing of the photograph or picture and extracted characters and graphic forms.
Figure 16B:
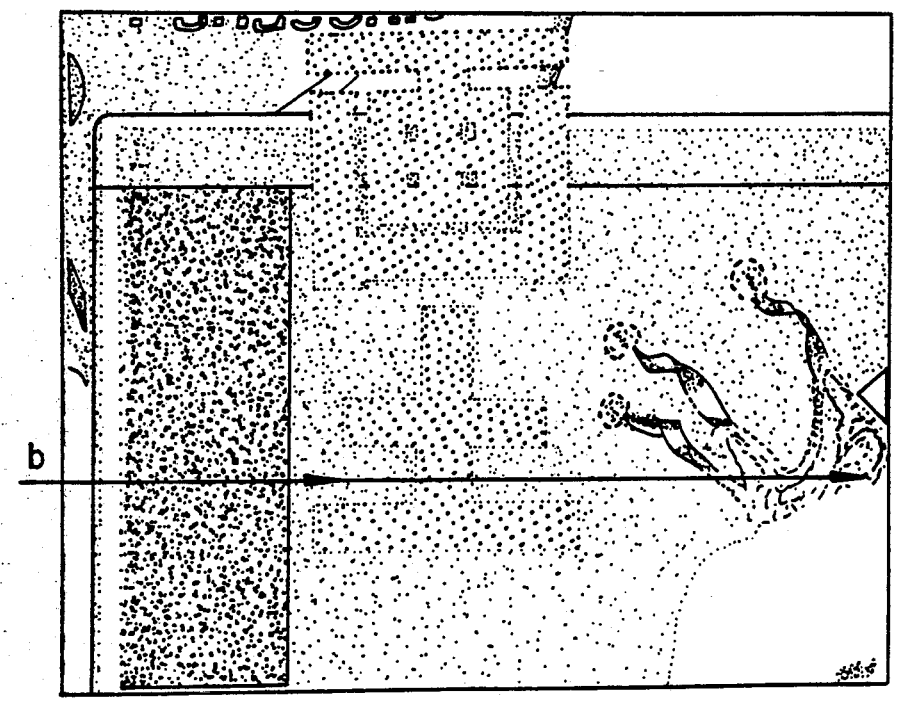
FIG. 16(b) is a diagram for illustrating a second example of the result of the synthesizing of the photograph or picture and the extracted characters and graphic forms.
Figures 17A, 17B:
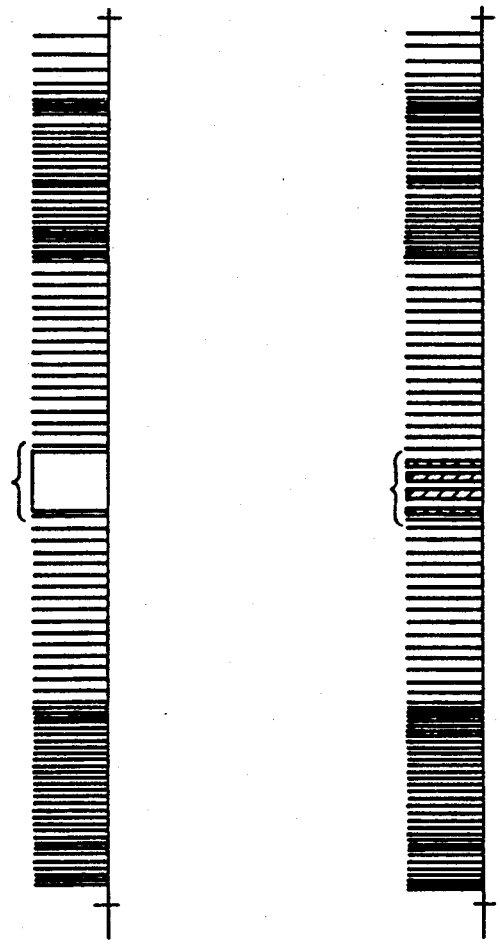
FIG. 17(a) is a waveform chart for illustrating bi-level dot data corresponding to a line a of FIG. 16(a)
FIG. 17(b) is a waveform chart for illustrating bi-level dot data corresponding to a line b of FIG. 16(b)

FIGS. 16(a) and (b) show the results of the extraction and image synthesizing processing of the dot patterns of the photograph or picture of FIG. 12(a) and the characters and graphic forms of FIGS. 14(a) and 14(b) represented by one of the C, M, Y and K halftones. FIG. 16(a) shows an example of the result of the synthesizing processing in case where only portions corresponding to the color code 1 indicating the characters are objects to be extracted and synthesized and portions corresponding to the color code 0 indicating the background are not objects to be extracted and synthesized. In case of this figure, the gradation levels of the C, M, Y and K halftones corresponding to the color code 1 are set to be 255, 255, 255 and 255, respectively, as described above. On the other hand, FIG. 16(b) shows another example of the result of the synthesizing processing in case where only portions corresponding to the color code 1 indicating the characters are objects to be extracted and synthesized. In this case, the gradation levels of the C, M, Y and K halftones corresponding to the color code 1 are set to be 64, 64, 64 and 64, respectively, as stated above. FIG. 17(a) illustrates bi-level dot data corresponding to a line a of FIG. 16(a); and FIG. 17(b) shows bi-level dot data corresponding to a line b of FIG. 16(b).

Figure 18A:
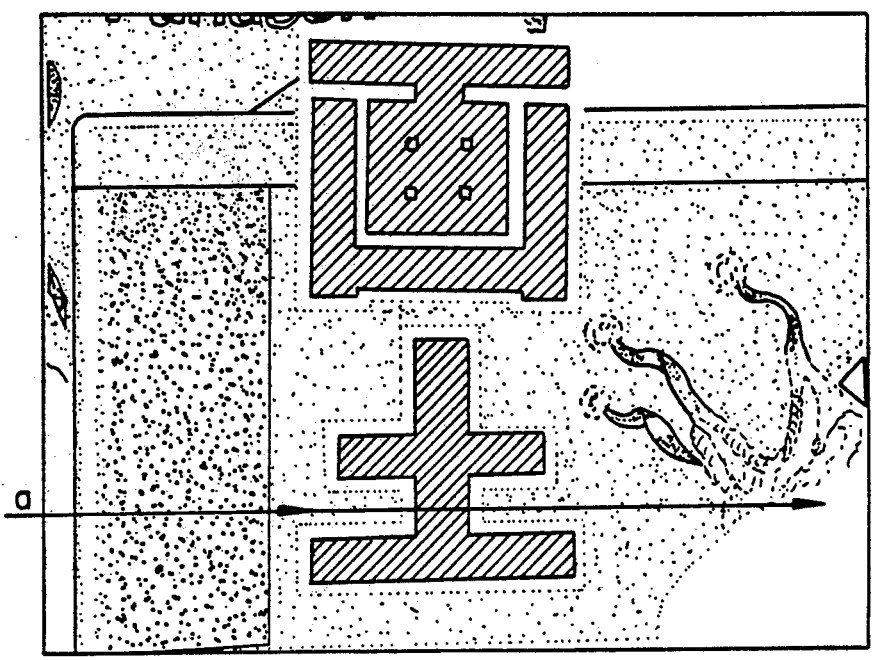
FIG. 18(a) is a diagram for illustrating a first example of the result of the synthesizing of the photograph or picture and extracted characters and graphic forms which are hemmed by white frames.
Figure 18B:
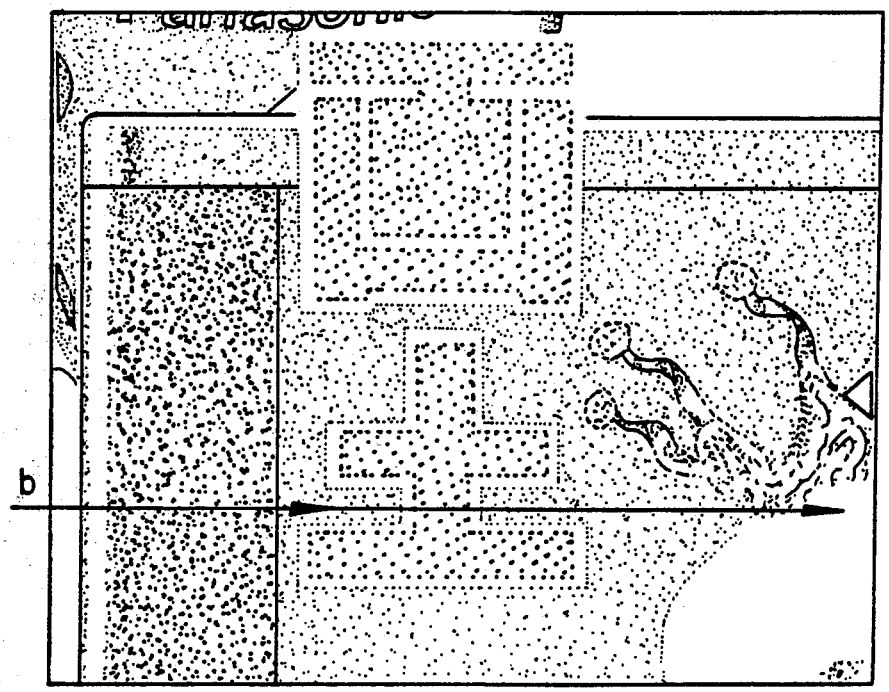
FIG. 18(b) is a diagram for illustrating a second example of the result of the synthesizing of the photograph or picture and the extracted characters and graphic forms which are hemmed by white frames.

Next, examples of the results of the image synthesis processing of FIGS. 18(a) and 18(b) will be described hereinbelow. These figures illustrate the results of the extraction and image synthesizing processing of the dot patterns of the photograph or picture of FIG. 12(a) and the characters and graphic forms of FIGS. 14(a) and 14(b) represented by one of the C, M, Y and K halftones. FIG. 18(a) shows an example of the result of the synthesizing processing in case where only portions corresponding to the color codes 1 and 2 respectively indicating the characters and the frames are objects to be extracted and synthesized and portions corresponding to the color code 0 indicating the background are not objects to be extracted and synthesized. In case of this figure, the gradation levels of the C, M, Y and K halftones corresponding to the color code 1 are set to be 255, 255, 255 and 255, respectively, and those of the C, M, Y and K halftones corresponding to the color code 2 are set to be 0, 0, 0 and 0, respectively. On the other hand, FIG. 18(b) shows another example of the result of the synthesizing processing in case where only portions corresponding to the color codes 1 and 2 respectively indicating the characters and the frames are objects to be extracted and synthesized. In this case, the gradation levels of the C, M, Y and K halftones corresponding to the color code 1 are set to be 64, 64, 64 and 64, respectively, and those of the C, M, Y and K halftones corresponding to the color code 2 are set to be 0, 0, 0 and 0, respectively. The dot patterns corresponding to the characters and graphic forms of FIGS. 16(a), 16(b), 18(a) and 18(b) are made to be different from those corresponding to the photograph or picture. Namely, the number of halftone-dot lines and the halftone-dot angle of the halftone dot patterns corresponding to the characters and graphic forms are small in comparison with those of the halftone dot pattern corresponding to the photograph or picture. Namely, the former patterns are coarse in comparison with the latter pattern. Thus, the halftone-dot patterns corresponding to color codes indicating the characters and graphic forms can be different in the number of halftone-dot lines and the halftone-dot angle from each other. As a result, various image effects can be obtained.

Figure 19A:
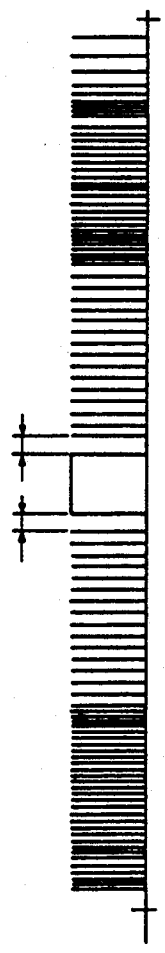
FIG. 19(a) is a waveform chart for illustrating bi-level dot data corresponding to a line a of FIG. 18(a)
Figure 19B:
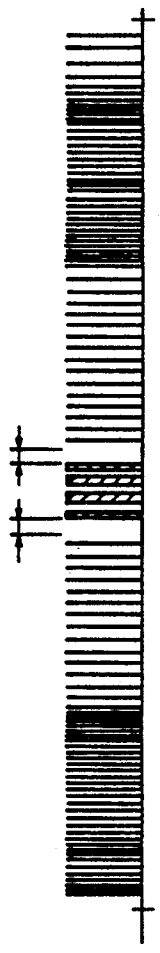
FIG. 19(b) is a waveform chart for illustrating bi-level dot data corresponding to a line b of FIG. 18(b)

Incidentally, FIG. 19(a) illustrates bi-level dot data corresponding to a line a of FIG. 18(a); and FIG. 19(b) illustrates bi-level dot data corresponding to a line b of FIG. 18(b). The bi-level dot patterns of FIGS. 199a) and 19(b) are different from those of FIGS. 17(a) and 17(b) in that each of the characters is hemmed by a white frame. The dot percent of the portion corresponding to the characters in the dot patterns of FIGS. 18(a) and 19(a) is nearly 100%. In contrast, that of the portion corresponding to the characters in the dot patterns of FIGS. 18(b) and 19(b) is 30% or so.

Figure 20:
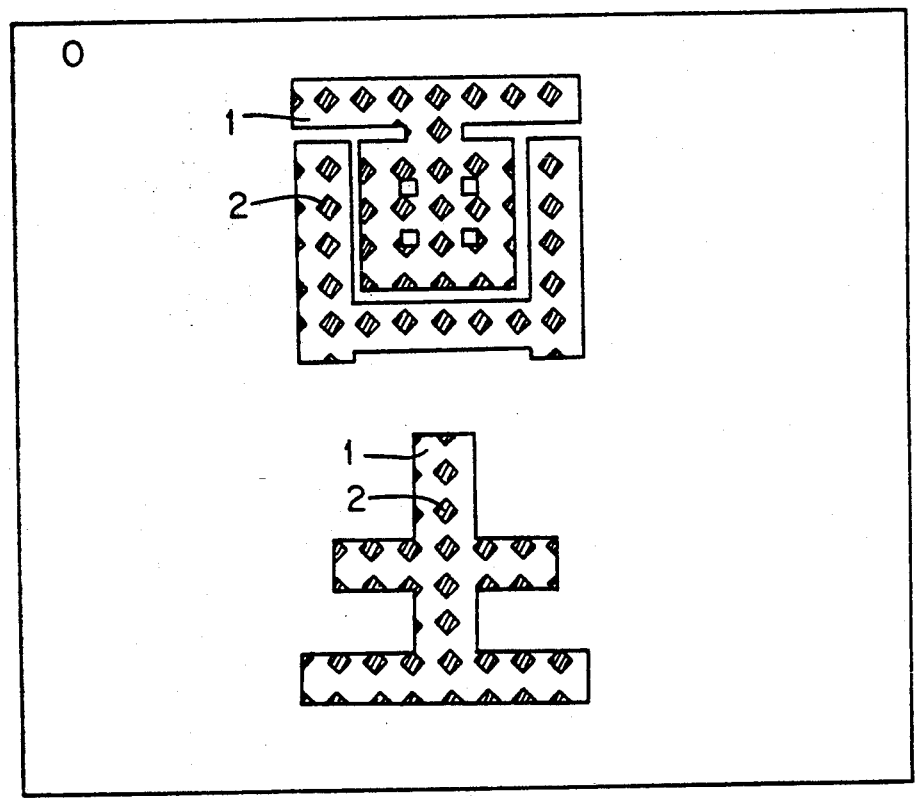
FIG. 20 is a diagram for illustrating an example in which characters to be inserted in the multi-level photograph or picture are already converted into bi-level dot patterns.

In the foregoing description, the results of the image synthesizing processing of practical examples of the picture, characters and graphic forms including whit frames of the characters as shown in FIG. 14(a) have been explained. Various pictures, characters and graphic forms can be extracted in other manners and synthesized. For example, another color code 3 is used to indicate the inside of a rectangular region hemming each character and extract the rectangular region. Furthermore, the extraction and image synthesis can be performed even in case where run-length encoding code data represents bi-level dot patterns of the characters and graphic forms are bi-level. Practically, a color code, for instance, 1 is assigned to black dots in the character regions; another color code 2 is assigned to white dots in the character regions; and further another code 0 is assigned to the background outside the character regions. Such assignment is realized by effecting the conversion and edition of the data in the external WS. FIG. 20 illustrates an example in which the color codes 1 and 2 are assigned to the white dots and the background, respectively, by an edition in the WS. Incidentally, an editing operation of providing frames to the outside or inside of the halftone-dot character regions can be performed by the WS by assigning a color code 4 to the frames.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An image synthesizing system for inputting data representing a multi-level picture and data representing bi-level characters and graphic forms and synthesizing the multi-level picture and the characters and graphic forms, comprising:

an interpolation circuit for interpolating data of neighboring pixels of the multi-level picture;

a first pattern memory for storing first dot pattern data representing dot patterns which correspond to the multi-level picture;

a first bi-level data comparison circuit for receiving interpolation data representing the result of an interpolation from the interpolation circuit and the first dot pattern data from the first pattern memory, for comparing the interpolation data with the first dot pattern data and for outputting first bi-level dot pattern data corresponding to the inputted picture;

a decompression circuit for converting data, which is obtained by a run-length encoding, representing the characters and graphic forms into region discriminating code data indicating whether each pixel thereof belongs to the character and graphic forms, a first look-up table unit for storing gradation levels of four color halftones, for receiving the region discriminating code data and for outputting data representing gradation levels of four color halftones in accordance with the received region discriminating code data;

a second look-up table unit for receiving the region discriminating code data and outputting synthesis control data to be used for controlling the extraction of the characters and graphic forms to be inserted into the multi-level picture and the synthesizing of the extracted characters and graphic forms and the multi-level picture;

a second pattern memory for storing second dot pattern data representing dot patterns which correspond to the characters and graphic forms;

a second bi-level data comparison circuit for receiving data representing the gradation levels, which is outputted from the first look-up table unit, and the second dot pattern data from the second pattern memory, for comparing the data representing the gradation levels with the second dot pattern data and for outputting second bi-level dot pattern data corresponding to the characters and graphic forms; and a selecting circuit for selectively outputting the bi-level dot pattern data corresponding to the inputted picture or the bi-level dot pattern data corresponding to the characters and graphic forms.

2. An image synthesizing system as set forth in claim 1, wherein the first dot pattern data stored in the first pattern memory is comprised of data representing four-color halftone sub-patterns which have nearly equal number of halftone-dot lines and nearly equal arrangement of dots but are different in halftone-dot angle from one another, and wherein the second dot pattern data stored in the second pattern memory is comprised of data representing four-color halftone sub-patterns which have nearly equal number of halftone-dot lines and nearly equal arrangement of dots but are different in halftone-dot angle from one another.

3. An image synthesizing system as set forth in claim 1, wherein the first dot pattern data stored in the first pattern memory is comprised of data representing four-color halftone sub-patterns which have nearly equal number of halftone-dot lines and nearly equal arrangement of dots but are different in halftone-dot angle from one another, and wherein the second dot pattern data stored in the second pattern memory is data representing a plurality of four-color halftone sub-patterns which have nearly equal number of halftone-dot lines and nearly equal arrangement of dots but are different in halftone-dot angle from one another.

4. An image synthesizing system as set forth in claim 2, wherein the data stored in the first look-up table unit is data representing the gradation levels of a cyanic halftone, a magenta halftone, a yellow halftone and a black halftone.

5. An image synthesizing system as set forth in claim 3, wherein the data stored in the first look-up table unit is data representing the gradation levels of a cyanic halftone, a magenta halftone, a yellow halftone and a black halftone.

6. An image synthesizing system as set forth in claim 2, wherein the data stored in the second look-up table unit is synthesis control data consists of first selection data used for indicating one of the four-color halftone sub-patterns of the dot patterns indicated by the second dot pattern data stored in the second pattern memory and second selection data used for indicating which of the first bi-level dot pattern data and the second bi-level dot pattern data.

7. An image synthesizing system as set forth in claim 3, wherein the data stored in the second look-up table unit is synthesis control data consists of first selection data used for indicating one of the four-color halftone sub-patterns of the dot patterns indicated by the second dot pattern data stored in the second pattern memory and second selection data used for indicating which of the first bi-level dot pattern data and the second bi-level dot pattern data.

8. An image synthesizing system as set forth in claim 6 which further comprising halftone selecting means for outputting halftone selecting control data indicating which of four-color halftone sub-patterns represented by the data stored in each of the first and second pattern memories and the first and second look-up table units should be processed, wherein the synthesis control data and the halftone selecting data are inputted to the second pattern memory and the selecting circuit to change the dot pattern to currently be used.

9. An image synthesizing system as set forth in claim 7 which further comprising halftone selecting means for outputting halftone selecting control data indicating which of four-color halftone sub-patterns represented by the data stored in each of the first and second pattern memories and the first and second look-up table units should be processed, wherein the synthesis control data and the halftone selecting data are inputted to the second pattern memory and the selecting circuit to change the dot pattern to currently be used.

* * * * *